United States Patent [19]

House et al.

[11] Patent Number: 4,528,104

[45] Date of Patent: Jul. 9, 1985

[54] OIL BASED PACKER FLUIDS

[75] Inventors: Roy F. House; Forrest A. Scearce, both of Houston, Tex.

[73] Assignee: NL Industries, Inc., New York, N.Y.

[21] Appl. No.: 409,491

[22] Filed: Aug. 19, 1982

[51] Int. Cl.³ .......................... C09K 7/06; E21B 36/00; E21B 43/24
[52] U.S. Cl. .................. 252/8.5 M; 166/272; 166/288; 166/302; 166/DIG. 1; 252/8.55 R
[58] Field of Search ............... 252/8.5 LC, 8.5 M, 28, 252/8.5 P, 363.5, 8.55 R, 8.5 A, 8.5 C; 166/288, 294, DIG. 1, 302, 272, 293, 282, 303

[56] References Cited

U.S. PATENT DOCUMENTS

| | | | |
|---|---|---|---|
| 2,531,427 | 11/1950 | Hauser | 260/448 |
| 2,531,812 | 11/1950 | Hauser | 252/8.5 M |
| 2,833,720 | 5/1958 | Stratton | 252/49.7 |
| 2,879,229 | 3/1959 | Stratton | 252/21 |
| 2,966,506 | 12/1960 | Jordan | 260/448 |
| 2,986,520 | 5/1961 | Freeman | 252/28 |
| 3,252,757 | 5/1966 | Granquist | 23/111 |
| 3,290,165 | 12/1966 | Iannicelli | 166/308 |
| 3,586,478 | 6/1971 | Neumann | 23/111 |
| 3,618,680 | 11/1971 | Ellard et al. | 166/DIG. 1 |
| 3,642,065 | 2/1972 | Blount | 166/244 R |
| 3,642,624 | 2/1972 | Howland et al. | 252/8.55 R |
| 3,650,327 | 3/1972 | Burnside | 166/DIG. 1 |
| 3,662,832 | 5/1972 | Keeler et al. | 166/302 |
| 3,666,407 | 5/1972 | Orlemann | 23/111 |
| 3,671,190 | 6/1972 | Neumann | 23/111 |
| 3,677,340 | 7/1972 | Blount | 166/315 |
| 3,685,583 | 8/1972 | Phares | 166/302 |
| 3,695,351 | 10/1972 | Lubinski | 166/96 |
| 3,700,050 | 10/1972 | Miles | 166/DIG. 1 |
| 3,719,601 | 3/1973 | Jacocks | 166/302 |
| 3,827,978 | 8/1974 | Miles | 252/8.5 M |
| 3,831,678 | 8/1974 | Mondshine | 166/DIG. 1 |
| 3,844,978 | 10/1974 | Hickson | 252/455 R |
| 3,844,979 | 10/1974 | Hickson | 252/455 R |
| 3,852,405 | 12/1974 | Granquist | 423/118 |
| 3,855,147 | 12/1974 | Granquist | 252/317 |
| 3,929,849 | 12/1975 | Oswald | 260/448 C |
| 4,042,032 | 8/1977 | Anderson et al. | 166/276 |
| 4,258,791 | 3/1981 | Brandt et al. | 166/302 |
| 4,260,498 | 4/1981 | Sample, Jr. et al. | 252/28 |
| 4,382,868 | 5/1983 | House | 252/28 |

OTHER PUBLICATIONS

World Oil, p. 85, (Jan. 1970), Alaskan Completions Will Be Complicated.
Petroleum Engineer, pp. 39-41, (Feb. 1972), BP's Unique Completion of High Rate Arctic Wells.
"Organophilic Bentonites, Swelling in Organic Liquids", by John W. Jordan, The Journal of Physical and Colloid Chemistry, vol. 53, No. 2, (1949).
The Oil and Gas Journal, p. 56, (Jan. 24, 1972), Permafrost Completions Use Gelatinous-Oil Fluid.
"Organophilic Bentonites, II—Organic Liquid Gels", by John W. Jordan, B. J. Hook & C. M. Finlayson, The Journal of Physical and Colloid Chemistry, vol. 54, No. 8, (1950).

Primary Examiner—Stephen J. Lechert, Jr.
Assistant Examiner—Howard J. Locker
Attorney, Agent, or Firm—Browning, Bushman, Zamecki & Anderson

[57] ABSTRACT

An oil base packer fluid for use in completing oil and gas wells comprising:
(a) a liquid oleaginous medium;
(b) an organophilic clay comprising the reaction product of an organic onium compound and a smectite clay;
(c) a polar dispersant for said clay; and
(d) a polyfunctional amino silane represented by the formula:

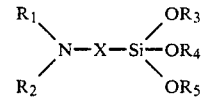

wherein $R_1$, $R_2$, $R_3$, $R_4$ and $R_5$ are each selected from the group consisting of hydrogen, alkyl, aryl, cycloalkyl, and alkylaryl; and X is selected from the group consisting of alkylene, arylene, alkarylene, arylalkylene, cycloalkylene, aminoalkylene, aminoarylene, aminoalkylarylene, aminoarylalkylene and aminocycloalkylene.

The packer fluids are characterized by being thin and pumpable at temperatures up to about 130° F. but are gelled to form an insulating medium at temperatures above about 130° F.

A method of completing oil and gas wells is also provided comprising placing the oil base packer fluid in the annular space between the tubing and the wellbore of said well at temperatures up to about 130° F., and raising the temperature within the wellbore by producing oil or gas through said pipe above about 130° F. to gel said fluid.

40 Claims, No Drawings

OIL BASED PACKER FLUIDS

BACKGROUND OF THE INVENTION

This invention is concerned with an oil base packer fluid for hydrocarbonaceous fluid wells such as oil and gas wells and a method for completing such wells, particularly wells drilled through the permafrost zones of the earth.

In many frigid areas of the world such as Northern Alaska and Canada, oil and gas wells are drilled through permafrost which is a permanently frozen layer at variable depth below the earth's surface. This permafrost presents a great obstacle to the removal of relatively warm fluids through the well pipe. The warm fluid in the well pipe causes thawing of the permafrost in the vicinity of the well. This thawing in turn causes disintegration of the well wall and subsidence of the surface. The warm gas or oil coming to the surface in the well pipe becomes cooled in giving up its heat to the permafrost and forms hydrate crystals which may freeze together and block the well pipe.

One method to alleviate this blockage problem is to place a gelatinous oil-based packer fluid as a thermal insulator in the annular space between the well pipe and well wall. Such insulating fluid is usually an oil to which has been added gel-building concentrates and a catalyst. At this fluid is pumped down the well hole in the annular space, gelatin of the fluid occurs depending on time and shear developed on the fluid. The so-gelled packer fluid decreases the heat transfer between the warm gas or oil rising in the well pipe and the well wall.

Although this method is effective in theory, it has been difficult to control gelation of the fluid. Thus, one problem associated with this method is that of gelation of the fluid before it is completely placed in the well due to mechanical problems, particularly pump failure. This premature increase in viscosity decreases the pump efficiency and increases the placement time and power requirements for placement. Expense is another important factor in designing a packer fluid for permafrost use.

In U.S. Pat. No. 3,618,680 to J. D. Ellard, a drilling fluid is provided consisting essentially of oil containing a minor but effective viscosifying amount, not exceeding 4.5 pounds per barrel, of at least one of subdivided asbestos and subdivided silica and containing substantially no water. Generally, the drilling fluid is cooled to below 27° F., but not below about 0° F. before use.

In U.S. Pat. No. 3,700,050 to L. H. Miles, a packer fluid is provided comprising a hydrocarbonaceous oil base fluid having a freezing point below 14° F. and having incorporated therein a thermal insulating and/or weighting amount of hollow shapes of glass or plastic and, optionally, halogenated ethane and/or halogenated ethylene. Although the packer fluid may perform satisfactorily, the high cost of the components and high transportation costs associated with the low bulk density hollow shapes render it economically prohibitive.

In U.S. Pat. No. 3,719,601 a liquid insulating medium is provided for use in insulating thermal injection wells, wells drilled through permafrost, and pipelines traversing a permafrost region. The medium comprises a mineral oil containing from 1% to 10% by weight of a fibrous finely-divided magnesium silicate or asbestos. Such insulating medium is very expensive due to the cost of the highly refined mineral oil used and, depending on the concentration of magnesium silicate or asbestos, has a high viscosity which makes placement of the medium within an annular space difficult.

In U.S. Pat. No. 3,831,678, an oil base packer fluid is described containing an organophilic clay gellant which will not yield or form a thick grease-consistency oil at temperatures below 50° F. This fluid can be easily pumped into the annulus opposite the permafrost as long as the temperature of the fluid does not exceed about 50° F. As such, this method is limited to ambient temperatures below 50° F. where the oil base packer fluid will not thicken during preparation prior to placement downhole.

Other methods of alleviating problems associated with the production of oil and gas in wells drilled through permafrost are described in the following references and U.S. Patents: WORLD OIL, p. 85 (January 1970); PETROLEUM ENGINEER, pp. 39–41 (February 1972); THE OIL AND GAS JOURNAL, p. 56 (January 24, 1972); U.S. Pat. Nos. 3,642,065; 3,662,832; 3,677,340; 3,685,583; and 3,695,351.

The present invention provides a relatively inexpensive oil base packer fluid containing an organophilic clay gellant and certain polyfunctional amino silanes. This fluid is thin and pumpable when prepared at temperatures less than about 130° F. but will gel to a thick grease consistency after placement downhole in an oil or gas well at temperatures above about 130° F. The so-gelled oil base packer fluid is an excellent insulator preventing the high temperatures within the well bore from thawing the permafrost. The oil base packer fluid is also useful in regular oil and gas wells, and in steam injection wells.

The fluid can be prepared at relatively high temperatures as for example in warmer weather without concern as to premature thickening before placement downhole.

SUMMARY OF THE INVENTION

In one embodiment of this invention, an oil base packer fluid is provided comprising a homogeneous mixture of:

(a) a liquid oleaginous medium;
(b) an organophilic smectite clay gellant;
(c) a polar dispersant; and
(d) a polyfunctional amino silane represented by the formula:

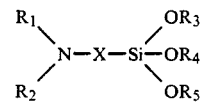

wherein $R_1$, $R_2$, $R_3$, $R_4$ and $R_5$ are each selected from the group consisting of hydrogen, alkyl, aryl, cycloalkyl, and alkylaryl; and X is selected from the group consisting of alkylene, arylene, alkarylene, arylalkylene, cycoalkylene, aminoalkylene, aminoarylene, aminoalkylarylene, aminoarylalkylene and aminocycloalkylene.

The oil base packer fluids of this invention containing an organophilic clay and a polyfunctional amino silane are characterized by being pumpable at temperatures below about 130° F. which yield, or form a thick grease at temperatures above about 130° F.

The term "yield" as used herein indicates the ability of the organophilic clay to thicken or gel the fluid. In effect, the present packer fluids of this invention remain thin and easily pumped at temperatures up to about 130° F., which are up to about 80° F. greater than yield temperatures of packer fluids treated only with an organophilic clay as in U.S. Pat. No. 3,831,678 hereinbefore mentioned. The present invention allows preparation of packer fluids, including Arctic Casing Packs, during warm weather when a packer fluid containing clay gellant alone would thicken too fast for pumping during preparation and placement down the annulus of a well hole. By virtue of the amino silane component of this invention, oil based packer fluids can be prepared containing high concentrations of organophilic clays which do not thicken at normal surface temperatures, i.e. below about 130° F.

In another embodiment of this invention, a method for completing hydrocarbonaceous fluid wells such as oil or gas wells drilled in permafrost regions by preventing the thawing of the permafrost surrounding the well bore is provided comprising placing the oil base packer fluid of this invention in the annular space between the drilling pipe and well bore at a temperature below about 130° F. and raising the temperature within the well bore by producing hydrocarbonaceous fluid through said pipe at temperatures above about 130° F. to gel said fluid.

DETAILED DESCRIPTION OF THE PREFERRED EMBODIMENTS

The liquid oleaginous media of the packer fluids of this invention includes crude petroleum and fractions thereof, as for example diesel oil, kerosene, fuel oil, light lubricating oil fractions, heavy naphtha having a boiling range between about 300° to 600° F., and the like. Because of the high cost associated with transporting goods into remote frigid areas of the world such as the North Slope of Alaska, the preferred media are crude petroleum oil from which the light ends have been removed, diesel oil resulting from a crude distillation of the crude petroleum oil produced in the region of use, still bottoms which are obtained from the crude distillation of the crude petroleum oil, and mixtures of these oleaginous media. When preparing packer fluids for frigid areas, the medium should also have a freezing point below the temperatures normally prevailing in a permafrost zone which is normally within the range of from about 14° to about 32° F.

The organophilic clay gellants used in the packer fluids of this invention comprise reaction products of organic onium compounds with naturally-occurring or synthetic clays. Such organophilic or organic modified clays are well known gellants or thickeners for oleaginous media such as oil based paints, drilling fluids, greases, printing inks and the like. Oleaginous compositions in which there are used non-gelling concentrations of asbestos and/or organic modified clays and a dispersant therefor, are well known and are used as oil well packer fluids and drilling fluids. (See U.S. Pat. Nos. 2,531,812 and 3,642,624.) The clay portion of the organophilic clay gellants are crystalline complex inorganic silicates, the exact composition of which cannot be precisely defined since they vary widely from one natural source to another. However, these clays can be described as complex inorganic silicates such as aluminosilicates and magnesium silicates containing in addition to the complex silicate lattice, varying amounts of cation-exchangeable ions such as calcium, magnesium and sodium. Hydrophilic clays which are preferred in this invention are the water-swelling smectite clays such as montmorillonite, hectorite, saponite, and particularly bentonite clay from Wyoming which contains exchangeable sodium ions. The clays may be used in the impure form as such or may be purified by centrifuging an aqueous slurry of the clay.

Smectite-type clays prepared synthetically by either a pneumatolytic or, preferably, a hydrothermal synthesis process can also be used to prepare the present organophilic clays. Representative of such clays are montmorillonite, bentonite, beidellite, hectorite, saponite and stevensite. These clays may be synthesized hydrothermally by forming an aqueous reaction mixture in the form of a slurry containing mixed hydrous oxides or hydroxides of the desired metals with or without, as the cause may be, sodium (or alternate exchangeable cation of mixture thereof) fluoride in the proportions for the particular synthetic smectite desired. The slurry is then placed in an autoclave and heated under autogenous pressure to a temperature within the range of approximately 100 to 325 degress centigrade, for a sufficient period of time to form the desired product. Representative hydrothermal processes for preparing synthetic smectites are described in the following U.S. Patents, incorporated herein by reference: U.S. Pat. Nos. 3,252,757 to Granquist; 3,586,478 to Neumann; 3,666,407 to Orlemann; 3,671,190 to Neumann; 3,844,978 and 3,844,979 to Hickson; and 3,852,405 and 3,855,147 to Granquist.

The cation exchange capacity of the smectite clays can be determined by the well-known ammonium acetate method.

The organic onium compounds reacted with the smectite clays are desirably acidic salts of primary, secondary and tertiary amines, preferably quarternary ammonium compounds. The onium compounds should contain at least one alkyl, alkylene or alkylidene radical having at least 10 carbon atoms, preferably from about 16 to 22 carbon atoms. Typical quarternary ammonium compounds are dimethyl dihydrogenated tallow ammonium chloride, trimethylhydrogenated tallow ammonium chloride, dimethylbenzyloctadecyl ammonium chloride and methylbenzyldioctadecyl ammonium chloride. A typical acid salt of an amine is the acid salt of cocoamine. Other organic onium compounds such as organic phosphonium compounds can be used. Organic modified clays and their preparation are more fully described in U.S. Pat. Nos. 2,531,427; 2,531,812; 2,966,506 and 3,929,849 herein incorporated by reference.

The preferred organophilic clays for use in this invention are dimethyldihydrogenated tallow ammonium bentonite, dimethylbenzylhydrogenated tallow ammonium bentonite, methylbenzyldihydrogenated tallow ammonium bentonite, and cocoamine bentonite.

Generally, the amount of organophilic clay contained in the packer fluid should be from about 10 lbs. to about 40 lbs. per 42 gallon barrel of fluid or about 0.25 to 1 lb. per gallon.

To aid in dispersing the organophilic clay in the oleaginous medium of the present oil base packer fluids and to cause the organophilic clay to yield in the oil phase, a polar dispersant is added to the system. The dispersant is used in the sense of the solvation agent referred to in the article, "Organophilic Bentonites, Swelling in Organic Liquids," by John W. Jordan, *The Journal of Physical and Colloid Chemistry,* Vol. 53, No. 2, 1949, and in the article, "Organophilic Bentonites, II—Organic Liquid Gels," by John W. Jordan, B. J. Hook, and C. M.

Finlayson, *The Journal of Physical and Colloid Chemistry*, Vol. 54, No. 8, 1950. Two United States patents which indicate the effect of dispersants in the preparation of greases are U.S. Pat. Nos. 2,833,720 and 2,879,229.

Materials which function as dispersants for organic modified clays in an oleaginous medium are well known to those skilled in the art. Such dispersants are generally water and/or low molecular weight, polar organic compounds such as, for example, alcohols, ketones, diketones, nitroalkanes, alkene carbonates, ether alcohols, ether esters, and the like. Representative dispersants are methanol, ethanol, acetone, methylethyl ketone, acetonylacetone, acetophenone, diethylketone, methyl-n-propyl ketone, 2,3-butanedione, nitromethane, nitroethane, 1-nitropropane, propylene carbonate, ethylene carbonate, ethyleneglycol monomethyl ether, ethyleneglycol monoethyl ether, diethyleneglycol monomethyl ether, ethyleneglycol monoacetate, diethyleneglycol monoacetate and similar low molecular weight polar organic compounds.

The preferred dispersant for the practice of the present invention is water including aqueous solutions of soluble inorganic salts such as sodium chloride, calcium chloride, and the like. The presence of such soluble inorganic salts in the water lowers its freezing point which is necessary for use in cold climates.

Generally from 2 to 20% by volume of dispersant based on the total liquid in the fluid is sufficient for this invention. When using an aqueous phase as the dispersant, a minimum of about 2% by volume of liquid phase is also required to cause the organophilic clay to yield in the oil phase at temperatures of about 130° F. or higher. Above 20% of dispersant may make the oil based fluid too thick during initial preparation because the so-formed emulsified water droplets will displace a portion of the oil used in the continuous phase.

The polyfunctional amino silanes of this invention are represented by the formula:

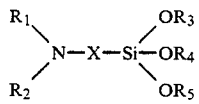

wherein $R_1$, $R_2$, $R_3$, $R_4$ and $R_5$ are each selected from the group consisting of hydrogen, alkyl, aryl, cycloalkyl, and alkylaryl; and X is selected from the group consisting of alkylene, arylene, alkarylene, aryalkylene, cycloalkylene, aminoalkylene, aminoarylene, aminoalkylarylene, aminoarylalkylene and aminocycloalkylene. Representative silanes are disclosed in U.S. Pat. Nos. 3,290,165 and 4,042,032, herein incorporated by reference.

Although the precise role of the polyfunctional amino silanes is not completely understood, it has been found that they function to slow or retard the organophilic clay from yielding in the oleaginous medium until the packer fluid achieves elevated temperatures. Preferably, the polyfunctional amino silanes are represented by the formula:

$$NH_2-Y-Si-(OR_6)_3$$

wherein Y is an alkylene or aminoalkylene radical containing from 2 to 8 carbon atoms in the alkylene group and $R_6$ is an alkyl radical containing from 1 to 5 carbon atoms.

A particularly preferred silane is gamma aminopropyl triethoxy silane, i.e. Y is a propylene radical and $R_6$ is an ethyl radical, which can be represented by the formula:

The amount of polyfunctional amino silane used in the packer fluid should be at least about 0.5% by volume of the total fluid, and no higher than 2% by volume. Amounts less than 0.5% by volume of the oil base packer fluid may be insufficient to cause the slowing effect on the yield of the organophilic clay gellant. Amounts greater than 2% by volume appear to have no additional beneficial effect on the performance of the silane. Preferably, the amount of silane should be about 1% for optimum performance.

The oil base packer fluid of this invention may also contain other conventional components such as water-in-oil emulsifiers, weighting agents, fluid loss control additives and the like.

A water-in-oil emulsifier is employed when water is used as the polar dispersant for the organophilic clay. Such emulsifier allows homogeneous dispersion of the water in the oleaginous medium. Generally, such emulsifiers should be present in an amount of from 5 lbs. to 15 lbs. per 42 gallon barrel of fluid. Weighting agents such as barite, galena, ilmenite, iron oxide or siderite may be employed in the packer fluids of this invention provided they are necessary to control the hydrostatic pressure within the borehole.

The final packer fluid containing all necessary and optional components should have a density of between about 8.5 lbs./gal. to 25 lbs./gal. Such density may be varied by adjusting the weighting agent concentration.

The packer fluids of this invention can be prepared by adding the organophilic clay, polar dispersant, polyfunctional amino silane, and other optional components to the oleaginous medium at temperatures below about 130° F. and mixing the components at low to medium shear to form a homogeneous dispersion of the components in the medium. Preferably, however, a portion of the total amount of organophilic clay is added to the medium initially along with the other components and mixed. Thereafter the remainder of the organophilic clay is added to this pre-mix and mixed.

The so-formed packer fluid is then transferred such as by pumping, into the annulus between a well bore and drill pipe which is to be insulated from the permafrost at a desired location at temperatures below about 130° F. Then the temperature of the well bore is elevated to above about 130° F. by producing oil or gas from the well through the drill pipe. The transfer of heat from the hot fluid to the packer fluid causes the packer fluid to form a thermal insulating gel which prevents thawing of the permafrost adjacent the well bore.

In order to more completely describe the present invention, the following examples are given. The following examples are offered to more fully illustrate the practice of this invention but should not, however, be considered as limiting.

EXAMPLES 1-7

This example illustrates the preparation and effect of temperatures on thickening of oil based packer fluids according to this invention containing inter alia an organophilic clay and a polyfunctional amino silane compared to packer fluids containing an organophilic clay alone.

A series of packer fluids according to this invention were prepared having a density of 12 lbs./gal. Each sample was prepared by adding 12.5 g of a water-in-oil emulsifier (EZ MULNL Baroid Division of NL Industries, Inc.), 9 ml. of water, 1.5 g of sodium chloride, 6 g of organophilic clay, 224 g of barite and 3.5 ml. of gamma-aminopropyl triethoxy silane (silane) to 259 ml. of diesel oil. The type of organophilic clay used was either dimethyldihydrogenated tallow ammonium bentonite (DDAB), or dimethyl benzylhydrogenated tallow (DBAB) ammonium bentonite. The mixture was stirred in a Hamilton Beach mixer at room temperature for 20 minutes to form a homogeneous dispersion. The dispersion was cooled to 32°–34° F. and then additional organophilic clay (18 g or 33 g) was added to the cold fluid which was stirred another 10 minutes with a Lightning mixer. The additional organophilic clay was either the same clay originally added or a different clay to form a mixture of clays in the fluid. Cocoamine bentonite (CAB) was also used as an additional clay.

Similarly, another series of packer fluids were prepared employing the same organophilic clays and the other ingredients except that no gamma-aminopropyl triethoxy silane was added.

Each sample prepared was placed on a Fann 35 Viscometer and the rheology periodically measured while heating the sample up to 180° F. Between measurements, the sample was stirred at 600 rpm with the Fann Viscometer. Each sample was heated to 70° F. before being placed into a heating jacket preheated to 200° F.

The yield point in lbs./100 sq. ft. of fluid was determined at various temperatures for each sample. Shear strength of each sample in lbs./100 sq. ft. was also determined after cooling each sample to 76° F. and after aging at 200° F. for 16 hours following by cooling to 76° F.

The following table summarizes the results.

TABLE 1

| | Organophilic Clay | | | Yield Pt. (lbs/100 ft$^2$) at T °F. | | | | | | | | Shear Strength (lbs/100 ft$^2$) | |
|---|---|---|---|---|---|---|---|---|---|---|---|---|---|
| EX. | Type | Amt. (g) | Silane | 40 | 60 | 80 | 100 | 120 | 140 | 160 | 180 | 76° | 76° F. post 200° F.* |
| 1 | DDAB$^{(1)}$ | 39 | None | 4 | 200 | 260 | 240 | 225 | 200 | 195 | — | 100 | 165 |
| 2 | DBAB$^{(2)}$ | 39 | None | — | 9 | 30 | 50 | 85 | 135 | 195 | — | 200 | 350 |
| 3 | DBAB$^{(2)}$ | 39 | 3.5 g | 2 | 12 | 15 | 20 | 30 | 40 | 80 | 130 | 70 | 500 |
| 4 | DDAB$^{(1)}$ + DBAB$^{(3)}$ | 6 + 18 | None | — | 1 | 10 | 70 | 225 | 275 | 185 | — | 180 | 320 |
| 5 | DDAB$^{(1)}$ + DBAB$^{(3)}$ | 6 + 18 | 3.5 g | 5 | 4 | 5 | 8 | 10 | 100 | 240 | — | 60 | 300 |
| 6 | DDAB$^{(1)}$ + CAB$^{(4)}$ | 6 + 18 | None | 2 | 2 | 6 | 20 | 35 | 160 | 290 | — | 250 | 700 |
| 7 | DDAB$^{(1)}$ + CAB$^{(4)}$ | 6 + 18 | 3.5 g | 1 | — | — | 3 | 5 | 15 | 35 | 140 | 110 | 200 |

*Sample aged at 200° F. for 16 hrs., then cooled to 76° F.
$^{(1)}$GELTONE (N L Industries, Inc.)
$^{(2)}$BARASPRAY (N L industries, Inc.)
$^{(3)}$BARAGEL 24 (N L Industries, Inc.)
$^{(4)}$BENTONE 18-C (N L Industries, Inc.)

As the table shows, packer fluids according to this invention, i.e. Examples 3, 5 and 7 did not yield or form a thick gel until temperatures of above about 120° F. were reached. In addition, the data shows that such fluids were thin and pourable at room temperatures but formed strong gels at high temperatures. Example 3 also shows that the present fluids will not yield at low temperatures even when large amounts of organophilic clay are added.

Examples 1, 2, 4 and 6 which did not employ a silane yielded at temperatures less than about 100° F.

We claim:

1. An oil base packer fluid comprising a mixture of:
   (a) a liquid oleaginous medium;
   (b) an organophilic clay comprising the reaction product of an organic onium compound and a smectite clay in an amount effective for gelling said packer fluid;
   (c) a polar dispersant for said clay; and
   (d) a polyfunctional amino silane represented by the formula:

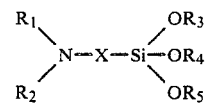

wherein $R_1$, $R_2$, $R_3$, $R_4$ and $R_5$ are each selected from the group consisting of hydrogen, alkyl, aryl, cycloalkyl, and alkylaryl; and X is selected from the group consisting of alkylene, arylene, alkarylene, arylalkylene, cycloalkylene, aminoalkylene, aminoarylene, aminoalkylarylene, aminoarylalkylene and aminocycloalkylene, in an amount sufficient to raise the yield temperature of said organophilic clay in said fluid.

2. The oil base packer fluid of claim 1 wherein said liquid oleaginous medium is selected from the group consisting of light lubricating oil fractions, heavy naphtha having a boiling range between about 300° to 600° F., crude petroleum oil from which the light ends have been removed, still bottoms and diesel oil obtained from the crude distillation of crude petroleum oil, and mixtures thereof.

3. The oil base packer fluid of claim 1 wherein said liquid oleaginous medium is diesel oil.

4. The oil base packer fluid of claim 1 wherein said smectite clay is selected from the group consisting of montmorillonite, hectorite and saponite.

5. The oil base packer fluid of claim 4 wherein said montmorillonite clay is Wyoming bentonite.

6. The oil base packer fluid of claim 1 wherein said organic onium compound is selected from the group consisting of acidic salts of primary, secondary, and tertiary organic amines and organic quarternary ammonium compounds, said organic onium compound containing at least one organic radical having at least 10 carbon atoms selected from the group consisting of alkyl, alkylene and alkylidene.

7. The oil base packer fluid of claim 1 wherein said polar dispersant is selected from the group consisting of water, and low molecular weight alcohols, ketones, diketones, nitroalkanes, alkene carbonates, ether alcohols, ether esters, and mixtures thereof.

8. The oil base packer fluid of claim 1 which further comprises a weighting agent.

9. An oleaginous fluid comprising a homogeneous mixture of:
(a) a liquid oleaginous medium selected from the group consisting of light lubricating oil fractions, heavy naphtha having a boiling range between about 300° to 600° F., crude petroleum oil from which the light ends have been removed, still bottoms and diesel oil from the crude distillation of crude petroleum oil and mixtures thereof;
(b) an organophilic clay comprising the reaction product of
an organic onium compound selected from the group consisting of acidic salts of primary, secondary and tertiary amines and organic quarternary ammonium compounds; said organic onium compound containing at least one organic radical having at least 10 carbon atoms selected from the group consisting of alkyl, alkylene and alkylidene, and
a smectite clay selected from the group consisting of montmorillonite, hectorite and saponite;
(c) a polar dispersant for said clay selected from the group consisting of water, and low molecular weight alcohols, ketones, diketones, nitroalkanes, alkene carbonates, ether alcohols, ether esters, and mixtures thereof; and
(d) a polyfunctional amino silane represented by the formula:

$$NH_2—Y—Si(OR_6)_3$$

wherein Y is an alkylene radical containing from 2 to 8 carbon atoms and $R_6$ is an alkyl radical containing from 1 to 5 carbon atoms in an amount sufficient to raise the yield temperature of said organophilic clay in said fluid.

10. The oil base packer fluid of claim 9 wherein said oleaginous medium is diesel oil.

11. The oil base packer fluid of claim 1 wherein said organic onium compound is a quarternary ammonium compound selected from the group consisting of dimethyldihydrogenated tallow ammonium chloride, trimethylhydrogenated tallow ammonium chloride, dimethylbenzylhydrogenated tallow ammonium chloride, methylbenzyldihydrogenated tallow ammonium chloride, and mixtures thereof.

12. The oil base packer fluid of claim 1 wherein said organic onium compound is the acid salt of cocoamine.

13. The oil base packer fluid of claim 1 wherein said polar dispersing agent is water.

14. The oil base packer fluid of claim 13 which further comprises a water-in-oil emulsifier and a freezing point depressant for said water.

15. The water base packer fluid of claim 9 wherein Y is propylene and $R_6$ is ethyl.

16. The oil base packer fluid of claim 9 which further comprises a weighting agent.

17. An oil base packer fluid comprising a homogeneous mixture of
(a) diesel oil;
(b) from 10 lbs. per 42 gallon barrel to 40 lbs. per 42 gallon barrel of the total fluid of an organophilic clay selected from the group consisting of dimethyldioctadecyl ammonium bentonite, dimethylbenzyloctadecyl ammonium bentonite, cocoamine bentonite and mixtures thereof;
(c) a clay dispersant comprising from 2% to 20% by volume of the total volume of liquid in said fluid of water; and
(d) at least 0.5% by volume of the total volume of liquid in said fluid of gamma aminopropyltriethoxy silane.

18. The oil base packer fluid of claim 17 which has a density of from 8.5 lbs./gal. to 20 lbs./gal.

19. The oil base packer fluid of claim 17 wherein said gamma aminopropyltriethoxy silane comprises 1% by volume of the total volume of liquid in said fluid.

20. The oil base packer fluid of claim 17 which further comprises barite.

21. The oil base packer fluid of claim 17 which further comprises a freezing point depressant for said water.

22. A method for completing a hydrocarbonaceous fluid well comprising:
(a) placing in the annular space in the wellbore of said well the oil base packer fluid of claim 1 at temperatures of up to about 130° F.; and
(b) raising the temperature within the wellbore to a temperature above about 130° F. to gel said fluid.

23. A method for completing a hydrocarbonaceous fluid well comprising:
(a) placing in the annular space in the wellbore of said well the oil base packer fluid of claim 10 at temperatures up to about 130° F.; and
(b) raising the temperature within the wellbore by producing hydrocarbonaceous fluid through said pipe at temperatures above about 130° F. to gel said fluid.

24. A method for completing a hydrocarbonaceous fluid well comprising:
(a) placing in the annular space in the wellbore of said well the oil base packer fluid of claim 19 at temperatures up to about 130° F.; and
(b) raising the temperature within the wellbore by producing hydrocarbonaceous fluid through said pipe at temperatures above about 130° F. to gel said fluid.

25. An oleaginous fluid comprising a mixture of a liquid oleaginous medium, an effective gelling amount of an organophilic clay comprising the reaction product of an organic onium compound and a smectite clay, and a dispersant for said organophilic clay in an effective dispersing amount, the improvement comprising a polyfunctional amino silane represented by the formula:

$$\begin{array}{c} R_1 \\ \diagdown \\ R_2 \diagup \end{array} N—X—Si \begin{array}{c} \diagup OR_3 \\ —OR_4 \\ \diagdown OR_5 \end{array}$$

wherein $R_1$, $R_2$, $R_3$, $R_4$ and $R_5$ are each selected from the group consisting of hydrogen, alkyl, aryl, cycloalkyl, and alkylaryl; and X is selected from the group consisting of alkylene, arylene, alkarylene, arylalkylene, cycloalkylene, aminoalkylene, aminoarylene, aminoalkylarylene, aminoarylalkylene and aminocycloalkylene in an amount sufficient to raise the yield temperature of said organophilic clay in said fluid.

26. The fluid of claim 25 which contains from 0.5% to 2% by volume of said silane.

27. The fluid of claim 26 wherein said silane is represented by the formula:

$$NH_2-[(CH_2)_nNH]_m-(CH_2)_n-Si(OR_6)_3$$

wherein $R_6$ is an alkyl radical containing from 1 to 5 carbon atoms, n is an integer from 1 to 8, and m is an integer from 0 to 4.

28. The fluid of claim 27 wherein $R_6$ is $C_2H_5$, m is 0 and n is 3.

29. The fluid of claim 26 wherein said onium compound is selected from the group consisting of acidic salts of primary, secondary and tertiary amines and quaternary ammonium compounds, said onium compound containing at least one radical having at least 10 carbon atoms selected from the group consisting of alkyl, alkylene and alkylidene, and wherein said smectite clay is bentonite.

30. The fluid of claim 29 wherein said dispersant is water in an amount from 2% to 20% of the total liquid volume in said fluid.

31. The fluid of claim 30 which further comprises a water-in-oil emulsifier for said water.

32. The fluid of claim 31 wherein said organophilic clay is present in the amount from about 10 lbs. to about 40 lbs. per 42 gallon barrel of said fluid.

33. The fluid of claim 31 wherein said organophilic clay is selected from the group consisting of methylbenzyldihydrogenated tallow ammonium bentonite, dimethylbenzylhydrogenated tallow ammonium bentonite, dimethyldihydrogenated tallow ammonium bentonite, trimethylhydrogenated tallow ammonium bentonite, cocoamine bentonite, and mixtures thereof.

34. The fluid of claim 33 wherein said oleaginous medium is diesel oil.

35. The fluid of claim 34 which further comprises a weighting agent in an amount to provide said fluid with a density of from about 8.5 lbs. per gal. to about 25 lbs. per gal.

36. The fluid of claim 35 wherein said silane is gammaaminopropyltriethoxy silane.

37. In a method of producing an oleaginous fluid wherein said fluid comprises a mixture of a liquid oleaginous medium, an effective gelling amount of an organophilic clay comprising the reaction product of an organic onium compound and a smectite clay, and a dispersant for said organophilic clay in an effective dispersing amount, the improvement comprising adding to said fluid a polyfunctional amino silane represented by the formula:

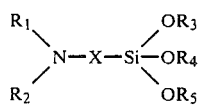

wherein $R_1$, $R_2$, $R_3$, $R_4$ and $R_5$ are each selected from the group consisting of hydrogen, alkyl, aryl, cycloalkyl, and alkylaryl; and X is selected from the group consisting of alkylene, arylene, alkarylene, arylalkylene, cycloalkylene, aminoalkylene, aminoarylene, aminoalkylarylene, aminoarylalkylene and aminocycloalkylene in an amount sufficient to raise the yield temperature of said organophilic clay in said fluid.

38. The fluid of claim 26 wherein said silane is gammaaminopropyltriethoxy silane.

39. In a method of producing a gelled oleaginous system which comprises a mixture of a liquid oleaginous medium, an effective gelling amount of an organophilic clay comprising the reaction product of an organic onium compound and a smectite clay, and a dispersant for said organophilic clay in an effective dispersing amount, the improvement comprising adding to said system a polyfunctional amino silane represented by the formula:

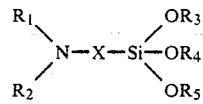

wherein $R_1$, $R_2$, $R_3$, $R_4$ and $R_5$ are each selected from the group consisting of hydrogen, alkyl, aryl, cycloalkyl, and alkylaryl; and X is selected from the group consisting of alkylene, arylene, alkarylene, arylalkylene, cycloalkylene, aminoalkylene, aminoarylene, aminoalkylarylene, aminoarylalkylene and aminocycloalkylene in an amount sufficient to raise the yield temperature of said organophilic clay in said system; and heating said system above said yield temperature to cause said system to gel.

40. In a method of producing an oil base packer fluid and transferring said fluid to a desired location within a wellbore, wherein said fluid comprises a mixture of a liquid oleaginous medium, an effective gelling amount of an organophilic clay comprising the reaction product of an organic onium compound and a smectite clay, and a dispersant for said organophilic clay in an effective dispersing amount, the improvement comprising:

(a) adding to said fluid a polyfunctional amino silane represented by the formula:

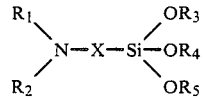

wherein $R_1$, $R_2$, $R_3$, $R_4$ and $R_5$ are each selected from the group consisting of hydrogen, alkyl, aryl, cycloalkyl, and alkylaryl; and X is selected from the group consisting of alkylene, arylene, alkarylene, arylalkylene, cycloalkylene, aminoalkylene, aminoarylene, aminoalkylarylene, aminoarylalkylene and aminocycloalkylene in an amount sufficient to raise the yield temperature of said organophilic clay in said fluid;

(b) placing said fluid at the desired location within said wellbore; and (c) raising the temperature of said fluid above said yield temperature of said organophilic clay to cause said fluid to gel.

* * * * *